United States Patent
Chen et al.

(10) Patent No.: US 7,868,954 B2
(45) Date of Patent: Jan. 11, 2011

(54) LIQUID CRYSTAL PANEL HAVING ELEMENTS FOR ELECTRICALLY COUPLING COMMON ELECTRODE AND COMMON LINES

(75) Inventors: Hung-Yu Chen, Miao-Li (TW); Tsau-Hua Hsieh, Miao-Li (TW); Chih-Hao Chen, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 287 days.

(21) Appl. No.: 12/080,407

(22) Filed: Apr. 2, 2008

(65) Prior Publication Data
US 2008/0239225 A1    Oct. 2, 2008

(30) Foreign Application Priority Data
Apr. 2, 2007    (TW) .............................. 96111565 A (51) Int. Cl.
*G02F 1/1343*    (2006.01)

(52) U.S. Cl. .......................................... 349/39; 349/38
(58) Field of Classification Search .................. None
See application file for complete search history.

(56) References Cited

U.S. PATENT DOCUMENTS

| 6,466,294 | B1 | 10/2002 | Yamagishi et al. | |
| 7,430,023 | B2* | 9/2008 | Chang | ......................... 349/43 |
| 2004/0201813 | A1 | 10/2004 | Wu | |
| 2006/0187369 | A1* | 8/2006 | Chang | ......................... 349/38 |
| 2007/0058125 | A1* | 3/2007 | Yoo et al. | .................... 349/152 |

* cited by examiner

*Primary Examiner*—Tina M Wong
(74) *Attorney, Agent, or Firm*—Wei Te Chung (57) ABSTRACT

An exemplary liquid crystal panel (400) includes a first substrate (401) having a common electrode layer (429), a second substrate (402) parallel to the first substrate, and a liquid crystal layer (403) between the first and second substrates. The liquid crystal layer defines an active area (406) thereat. The second substrate includes common lines (440). Electrical coupling elements are disposed at the active area, so as to electrically couple the common electrode layer to the common lines.

5 Claims, 5 Drawing Sheets

LIQUID CRYSTAL PANEL HAVING ELEMENTS FOR ELECTRICALLY COUPLING COMMON ELECTRODE AND COMMON LINES

FIELD OF THE INVENTION

The present invention relates to a liquid crystal panel having electrical coupling elements, which typically are configured for electrically coupling common lines of a thin film transistor (TFT) substrate to a common electrode layer of a color filter (CF) substrate in an active area of the liquid crystal panel.

GENERAL BACKGROUND

Liquid crystal displays (LCDs) are widely used in various modern information products, such as notebooks, personal digital assistants, video cameras and the like. A typical LCD includes a liquid crystal panel. The liquid crystal panel is used to display images according to driving signals transmitted thereto.

Figure 7:
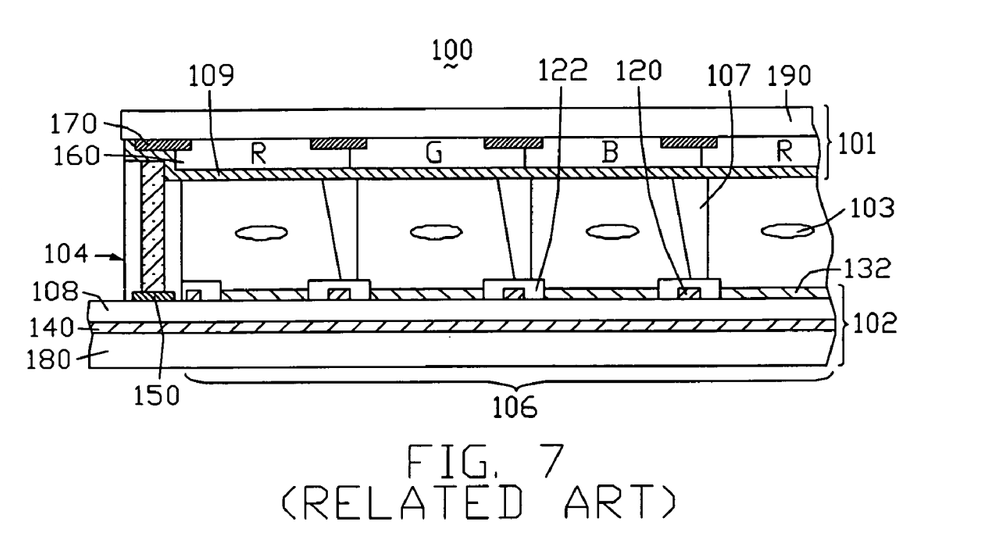
FIG. 7 is a side cross-sectional view of part of a conventional liquid crystal panel, the liquid crystal panel including a plurality of pixel units.

FIG. 7 is a side cross-sectional view of part of a conventional liquid crystal panel 100. The liquid crystal panel 100 includes a CF substrate 101, a TFT substrate 102, a sealant 104, a plurality of spacers 107, and a liquid crystal layer 103. The CF substrate 101 is parallel to the TFT substrate 102. The sealant 104 is disposed between the TFT substrate 102 and the CF substrate 101, and cooperates with the CF substrate 101 and the TFT substrate 102 to form a closed accommodating space (not labeled) therebetween. The liquid crystal layer 103 and the spacers 107 are received in the accommodating space, with the spacers 107 regularly arranged. Moreover, a main region of the liquid crystal panel 100 where the liquid crystal layer 103 is located is defined as an active area 106. The active area 106 includes a plurality of pixel units (not labeled) arranged in a matrix, so as to form an active matrix (AM).

The CF substrate 101 includes a first base plate 190, a light shielding layer 170, a CF layer 160, and a common electrode layer 109. The light shielding layer 170 is disposed on the first base plate 190, and is patterned to be a so-called black matrix. The CF layer 160 includes a plurality of color filer units R, G, B disposed regularly and separately at the light shielding layer 170. The common electrode layer 109 is disposed on the CF layer 160. The common electrode layer 109 includes a plurality of common electrodes (not labeled), each of which corresponds to a respective pixel unit.

Figure 8:
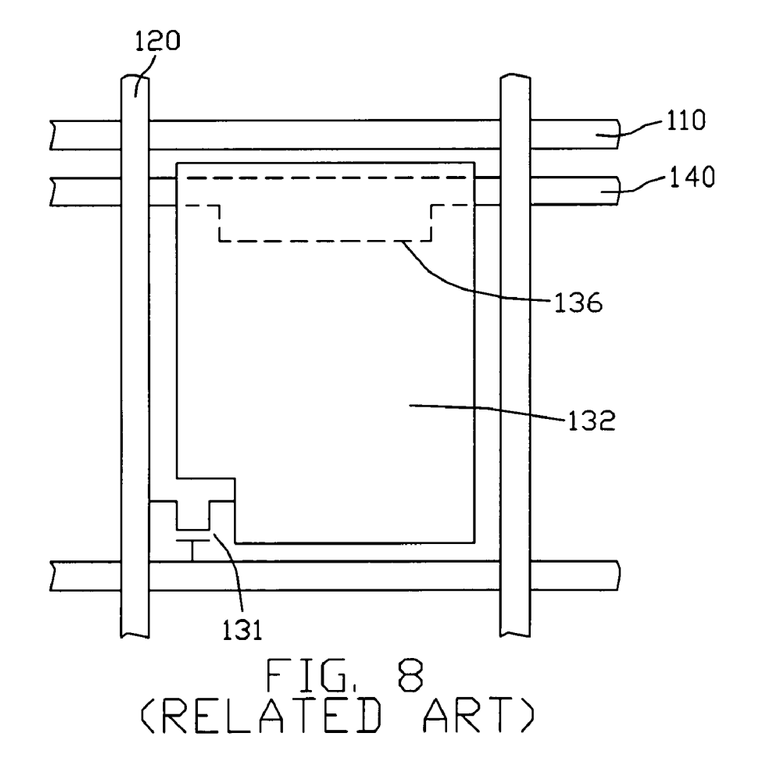
FIG. 8 is an enlarged, top plan view of one of the pixel units of the liquid crystal panel of FIG. 7.

Referring also to FIG. 8, the TFT substrate 102 includes a second base plate 180, a plurality of scanning lines 110, a plurality of common lines 140, a first insulating layer 108, a plurality of data lines 120, a plurality of TFTs 131, a plurality of pixel electrodes 132, and a second insulating layer 122. The scanning lines 110 and the common lines 140 are alternately disposed on the second base plate 180. The first insulating layer 108 covers the scanning lines 110 and the common lines 140. The data lines 120 and the pixel electrodes 132 are alternately disposed on a portion of the first insulating layer 108 that is in the active area 106. The second insulating layer 122 covers the data lines 120, such that the data lines 120 are insulated from the pixel electrodes 132. A common terminal 150 is disposed on a portion of the first insulating layer 108 that is outside the active area 106. The common terminal 150 is electrically coupled to the common lines 140, and to the common electrodes of the common electrode layer 109.

In each pixel unit, the pixel electrode 132, the corresponding common electrode, and liquid crystal molecules (not shown) therebetween cooperatively form a liquid crystal capacitor. Each common line 140 includes a plurality of extending portions 136. Each extending portion 136 serves as a second common electrode of a corresponding pixel unit. In each pixel unit, the pixel electrode 132, the corresponding extending portion 136, and the portion of the first insulating layer 108 therebetween cooperatively form a storage capacitor.

In operation, a common voltage signal is applied to the common terminal 150, and is further transmitted to the common electrode and the extending portion 136 of each pixel unit. A scanning signal is applied to the TFT 131 of the pixel unit via the corresponding scanning line 110, such that the TFT 131 is switched on. A data voltage signal is applied to the pixel electrode 132 via the corresponding data line 120 and the on-state TFT 131. Thereby, the liquid crystal capacitor and the storage capacitor are charged simultaneously, and an electric field is generated between the pixel electrode 132 and the common electrode. The electric field causes the liquid crystal molecules of the liquid crystal layer 103 to twist to a corresponding angle, so as to enable the pixel unit to display a particular color (red, green, or blue) having a corresponding gray level. The aggregation of colors displayed by all the pixel units simultaneously constitutes an image viewed by a user of the liquid crystal panel 100.

In the liquid crystal panel 100, the first insulating layer 108 covers the common lines 140, and the data lines 120 are disposed on the first insulating layer 108. Thereby, parts of each data line 120 superpose the common lines 140, and a plurality of unwanted parasitic capacitors are formed in the superposing regions. Due to a so-called capacitor coupling effect of the parasitic capacitors, when the data voltage signal transmitting in any one data line 120 changes, an electrical potential of the corresponding extending portions 136 may be coupled and shifted. At each pixel unit, this is liable to cause the voltage of the storage capacitor to be shifted and become different from the voltage of the liquid crystal capacitor. Accordingly, the gray level of the color displayed by the pixel unit is unstable and apt to change. Thus the display quality of the liquid crystal panel 100 may be unsatisfactory.

What is needed is a liquid crystal panel that can overcome the above-described deficiencies.

SUMMARY

In one aspect, a liquid crystal panel includes a first substrate having a common electrode layer, a second substrate parallel to the first substrate, and a liquid crystal layer disposed between the first and second substrates. The liquid crystal layer defines an active area thereat. The second substrate includes a plurality of common lines. A plurality of electrical coupling elements are disposed at the active area. At least one of the electrical coupling elements is provided for each common line. The electrical coupling elements provide electrical coupling between the common electrode layer and the common lines.

In another aspect, a liquid crystal panel includes a first substrate having a common electrode layer, a second substrate parallel to the first substrate, and a liquid crystal layer disposed between the first and second substrates. A viewing region defined by the liquid crystal layer comprises a plurality of pixel regions arranged row by row. Each pixel region comprises a common electrode disposed thereat. In each row of the pixel regions at least one element electrically coupling at least one of the common electrodes of the pixel regions to the common electrode layer is provided.

DETAILED DESCRIPTION OF PREFERRED EMBODIMENTS

Reference will now be made to the drawings to describe preferred and exemplary embodiments of the present invention in detail.

Figure 1:
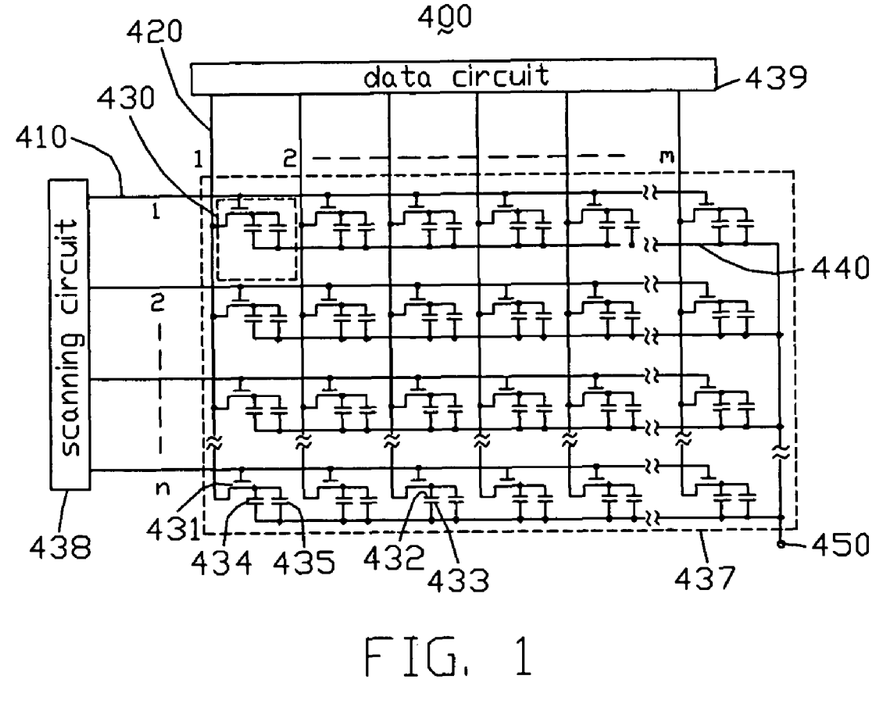
FIG. 1 is an abbreviated circuit diagram of a liquid crystal panel according to a first embodiment of the present invention, the liquid crystal panel including a plurality of common lines and a plurality of pixel units.

FIG. 1 is an abbreviated circuit diagram of a liquid crystal panel 400 according to a first embodiment of the present invention. The liquid crystal panel 400 includes a scanning circuit 438, a data circuit 439, and an active matrix (AM) 437. The AM 437 includes n rows of parallel scanning lines 410, n rows of parallel common lines 440 alternately arranged with the scanning lines 410, m columns of parallel data lines 420 perpendicular to the scanning lines 410 and the common lines 440, and a plurality of pixel units 430 cooperatively defined by the crossing scanning lines 410 and data lines 420. In particular, a smallest rectangular area formed by any two adjacent scanning lines 410 together with any two adjacent data lines 420 defines one pixel unit 430. Thus, the pixel units 430 are arranged in a matrix. The scanning lines 410 are electrically coupled to the scanning circuit 438, the data lines 420 are electrically coupled to the data circuit 439, and the common lines 440 are electrically coupled to a common terminal 450. The common terminal 450 is disposed outside the AM 437, and is electrically coupled to a common voltage generating circuit (not shown) for receiving a common voltage signal.

Each pixel unit 430 includes a TFT 431, a pixel electrode 432, a first common electrode 433, and a storage capacitor 435. The TFT 431 is disposed near an intersection of a corresponding one of the scanning lines 410 and a corresponding one of the data lines 420. A gate electrode of the TFT 431 is electrically coupled to the scanning line 410, and a source electrode of the TFT 431 is electrically coupled to the data line 420. Further, a drain electrode of the TFT 431 is electrically coupled to the pixel electrode 432. The pixel electrode 432, the first common electrode 433, and liquid crystal molecules (not shown) therebetween cooperatively form a liquid crystal capacitor 434. The storage capacitor 435 and the liquid crystal capacitor 434 are connected in parallel in the pixel unit 430, with the first common electrode 433 electrically coupled to a corresponding one of the common lines 440.

Figure 2:
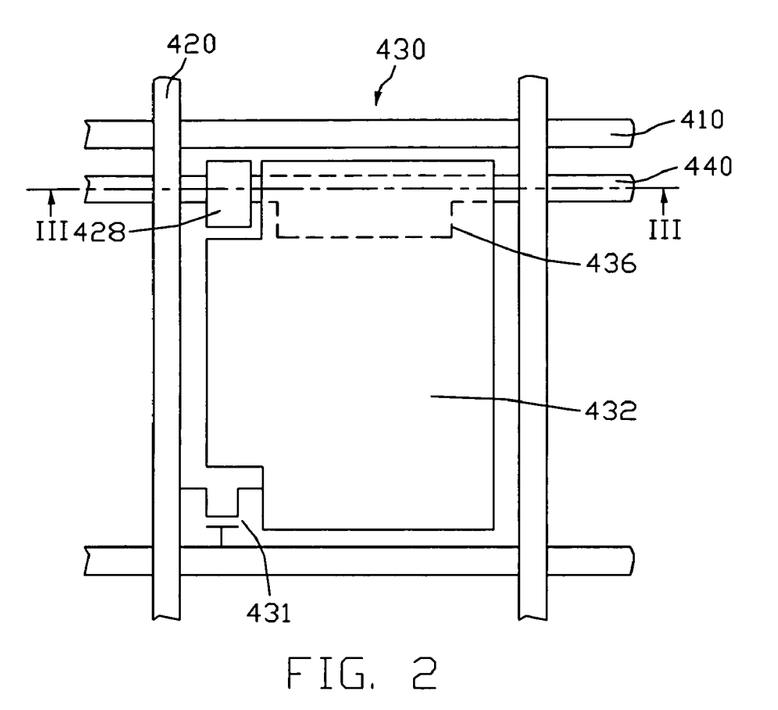
FIG. 2 is an enlarged view of one of the pixel units of the liquid crystal panel of FIG. 1, the pixel unit including a common line and an extending electrode.

Referring also to FIG. 2, each common line 440 includes a plurality of extending portions extending perpendicularly from a main body of the common line 440. Each extending portion serves as a second common electrode 436 for a respective pixel unit 430. In the pixel unit 430, the second common electrode 436 is opposite to the corresponding pixel electrode 432, so as to form the storage capacitor 435. The pixel electrode 432 defines a first cutout (not labeled) at a bottom left corner thereof for providing room for the TFT 431, and a second cutout (not labeled) at a top left corner thereof. The second cutout is for providing room for an extending electrode 428. The extending electrode 428 is used to electrically couple the first common electrode 433 to the common line 440.

Figure 3:
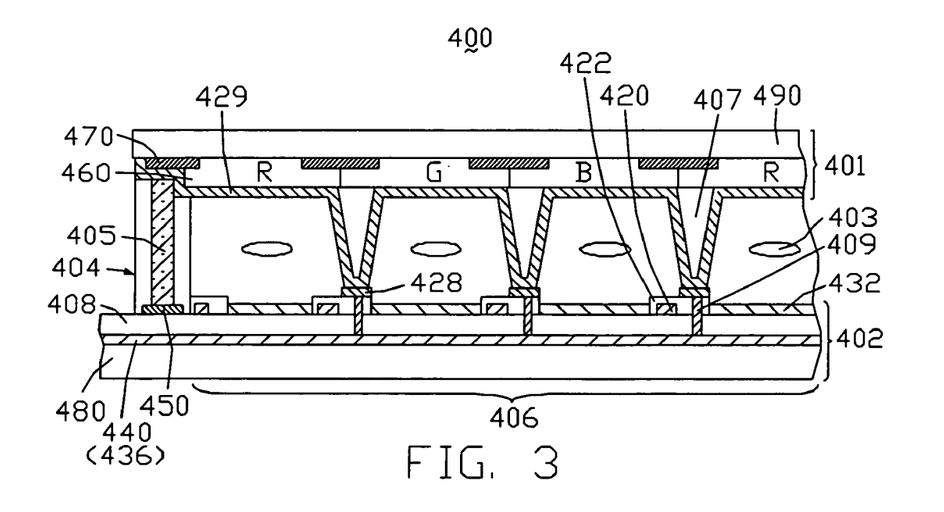
FIG. 3 is a side cross-sectional view of part of the liquid crystal panel of the first embodiment, corresponding to line III-III of FIG. 2 and including the pixel unit of FIG. 2.

Referring also to FIG. 3, the liquid crystal panel 400 further includes a first substrate 401, a second substrate 402, a sealant 405, and a liquid crystal layer 403. The first substrate 401 and the second substrate 402 are parallel to each other, and can respectively be a CF substrate and a TFT substrate. The sealant 405 is disposed between the first substrate 401 and the second substrate 402, so as to form a closed accommodating space (not labeled) therebetween for receiving the liquid crystal layer 403. Moreover, a main region of the liquid crystal panel 400 where the liquid crystal layer 403 is located is defined as an active area 406. The AM 437 is disposed at the active area 406.

The first substrate 401 includes a transparent first base plate 490, a light shielding layer 470, and a CF layer 460. The first base plate 490 can be made of any suitable material such as glass. The light shielding layer 470 is disposed on the first base plate 490, and is patterned to be a so-called black matrix. The CF layer 460 includes a plurality of red units R, a plurality of green units G, and a plurality of blue units B. The red units R, the green units G, and the blue units B are disposed regularly and separately at the light shielding layer 470. A plurality of spacers 407 are disposed on the CF layer 460. In particular, each of the spacers 407 corresponds to a pixel unit 430, and is located opposite to a corresponding portion of the light shielding layer 470. Moreover, a common electrode layer 429 covers the spacers 407 and the CF layer 460. The portions of the common electrode layer 429 covering the CF layer 460 can be notionally divided into a plurality of rectangular pieces, each of which serves as a respective one of the first common electrodes 433.

The second substrate 402 includes a transparent second base plate 480, a first insulating layer 408, a second insulating layer 422, and a plurality of extending electrodes 428. The second base plate 480 can be made of any suitable material such as glass. The scanning lines 410 and the common lines 440 are alternately disposed on the second base plate 480. The first insulating layer 408 covers the scanning lines 410 and the common lines 440. A transparent electrode layer, which includes the plurality of pixel electrodes 432, is disposed on the portion of the first insulating layer 408 that is in the active area 406. Portions of the first insulating layer 408 between the pixel electrodes 432 and the second common electrodes 436 of the common lines 440 serve as the intervening medium of the corresponding storage capacitors 435. The data lines 420 are alternately disposed between the pixel electrodes 432, with the second insulating layer 422 covering the data lines 420. Thereby, the data lines 420 are insulated from the pixel electrodes 432.

The extending electrodes 428 are alternately disposed on the second insulating layer 422. Each of the extending electrodes 428 is positioned in the second cutout of the corresponding pixel electrode 432, and superposes the corresponding common line 440 without superposing the corresponding data line 420. Further, each of the extending electrodes 428 supports a corresponding spacer 407. Thus, each portion of the common electrode layer 429 that covers a corresponding one of the spacers 407 is sandwiched between the spacer 407 and the extending electrode 428, and abuts the extending electrode 428.

Figure 4:
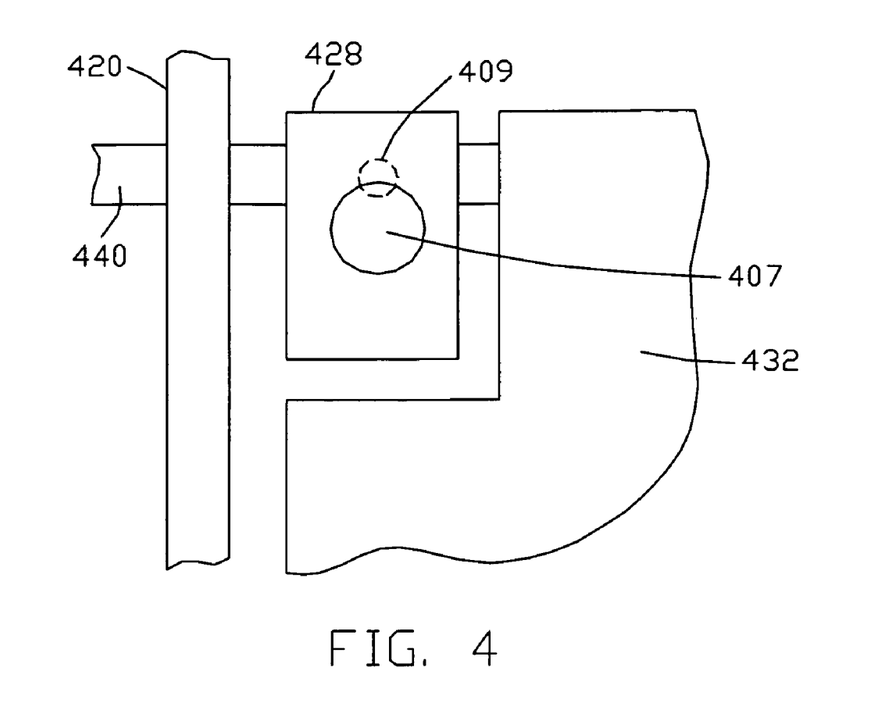
FIG. 4 is an enlarged view of part of the pixel unit of FIG. 2, showing an electrical coupling relationship between the common line and the extending electrode.

Referring also to FIG. 4, each of a plurality of through holes 409 is formed between a corresponding extending electrode 428 and the corresponding common line 440. Each through hole 409 spans through both the first insulating layer 408 and a corresponding portion of the second insulating layer 422, and includes electrical conductive material (e.g. aluminum) filled therein. Due to the through holes 409, the extending electrodes 428 are formed as electrodes extending toward the first substrate 401 from the common lines 440. With this configuration, the common electrode layer 429 is electrically coupled to the common lines 440 via the extending electrodes 428 and the through holes 409 in the active area 406.

The common terminal 450 is disposed on a portion of the first insulating layer 408 that is outside the active area 406, and is electrically coupled to the common lines 440. The sealant 404 includes electrical conductive material 405 embedded therein. A top end of the sealant 404 contacts the common electrode layer 429, and an opposite bottom end of the sealant 404 covers the common terminal 450. Thus the first common electrodes 433 are electrically coupled to the common terminal 450 via the electrical conductive material 405 of the sealant 404.

In operation, the common terminal 450 receives a common voltage signal from the common voltage generating circuit, and the common voltage signal is then outputted to the first common electrodes 433 and the common lines 440. The scanning circuit 438 provides a plurality of scanning signals to the scanning lines 410 sequentially, so as to switch the corresponding TFTs 431 on. The data circuit 439 provides data voltage signals to the pixel electrodes 432 via the corresponding data lines 420 and the on-state TFTs 431. Thereby, in each pixel unit 430, the liquid crystal capacitor 434 and the storage capacitor 435 are charged simultaneously, and an electric field is generated between the pixel electrode 432 and the first common electrode 433. The electric field causes the liquid crystal molecules of the liquid crystal layer 403 to twist to a corresponding angle, so as to enable the pixel unit 430 to display a certain color (red, green, or blue) having a corresponding gray level. The aggregation of colors displayed by all the pixel units simultaneously constitutes an image viewed by a user of the liquid crystal panel 400. Moreover, after the charging process, a voltage of the liquid crystal capacitor 434 is the same as that of the storage capacitor 435; and due to the storage capacitor 435, the gray level of the color displayed by the pixel unit 430 is maintained.

In the liquid crystal panel 400, the extending electrodes 428 and the through holes 409 are configured as electrical coupling elements disposed at the active area 406, and the common electrode layer 429 is electrically coupled to the common lines 440 in the active area 306 via the electrical coupling elements. Thereby, any variations in electrical potentials of the second common electrodes 436 in the common lines 440 are stabilized by the common electrode layer 429; and in each pixel unit 430, the voltages of the storage capacitor 435 and the liquid crystal capacitor 434 are maintained to be the same. That is, the storage capacitor 435 can be charged sufficiently, and voltage coupling or shifting due to the capacitor coupling effect of parasitic capacitors formed by the superposing of the data lines 420 and the common lines 440 can be diminished or even eliminated. Therefore the gray level of the color displayed by the pixel unit 430 is stable, and the display quality of the liquid crystal panel 400 is correspondingly improved.

Moreover, each second common electrode 436 is electrically coupled to a respective portion of the first common electrode 433 covering the corresponding spacer 407 via a respective electrical coupling element. Such electrical coupling element prevents the electrical potential of the second common electrode 436 of the pixel unit 430 from being pulled up or pulled down by the adjacent pixel units 430 when the data voltage signals of the adjacent pixel units 430 change. Therefore, compared with the above-described conventional liquid crystal panel 100, the gray level of the color displayed by the pixel unit 430 is even more stable.

In practice, during a typical process of manufacturing the liquid crystal panel 400, it is difficult to perfectly align all the spacers 407 with the corresponding through holes 409. One reason is that each through hole 409 is usually small. Therefore if the extending electrodes 428 were not provided, the portion of the common electrode layer 429 covering each spacer 407 would have to be electrically coupled to the corresponding common line 440 via the corresponding through hole 409 only. In such case, when the position of a spacer 407 slightly deviates from the corresponding through hole 409, an open circuit may be generated. Thus the extending electrodes 428 are provided in the liquid crystal panel 400 to circumvent the above-described potential problems. The portions of the common electrode layer 429 covering the spacers 407 abut the corresponding extending electrodes 428, and are thus electrically coupled to the common lines 440 via the extending electrodes 428 and the through holes 409. Thereby, even if the spacers 407 are not fully aligned with the corresponding through holes 409, the extending electrodes 428 help ensure that electrical coupling between the common lines 440 and the common electrode layer 429 in all the pixel units 430 is still achieved. Moreover, the extending electrodes 428 can be formed via a manufacturing process associated with a process for forming the pixel electrodes 432. That is, the extending electrodes 428 and the pixel electrodes 432 can be formed simultaneously, without the need for a separate, extra manufacturing process.

Figure 5:
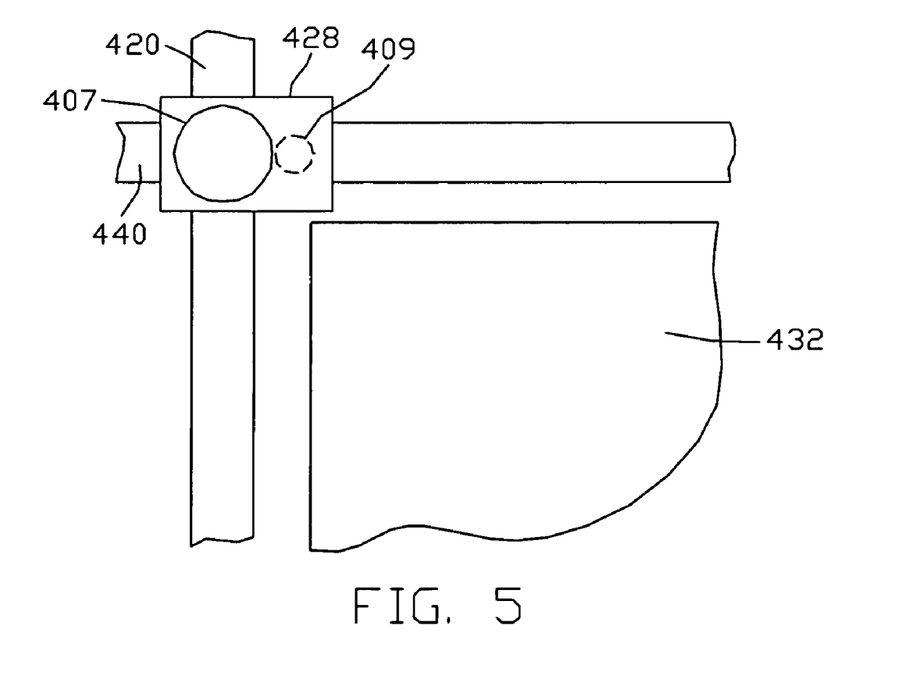
FIG. 5 is similar to FIG. 4, but showing part of one pixel unit of a liquid crystal panel according to an alternative embodiment.

Referring to FIG. 5, in an alternative embodiment, each extending electrode 428 can be positioned above the crossing of the corresponding data line 420 and the corresponding common line 440, with the spacer 407 being aligned with the data line 420. With such configuration, the pixel electrode 432 need not have the second cutout. Accordingly, an aperture ratio of the liquid crystal panel 400 can be increased.

In another alternative embodiment, the number of electrical coupling elements can be reduced, provided that each of the common lines 440 has at least one electrical coupling element. This is because the second common electrodes 436 of the pixel units 430 in a same row of the matrix extend from a same one of the common lines 440, and each common line 440 corresponds to a respective row of the matrix. Each of the data lines 420 crosses all the common lines 420, and the data voltage signals are applied to the activated row of pixel units 430 via the data lines 420 simultaneously. Therefore the electrical potentials of the second common electrodes 436 extending from each common line 440 may be coupled by the data voltage signals and shift, even though the corresponding row of pixel units 430 are inactivated. Thus in order to prevent the electrical potentials of the second common electrodes 436 from being coupled by the data voltage signals, it is necessary to provide at least one electrical coupling element for each common line 440.

Figure 6:
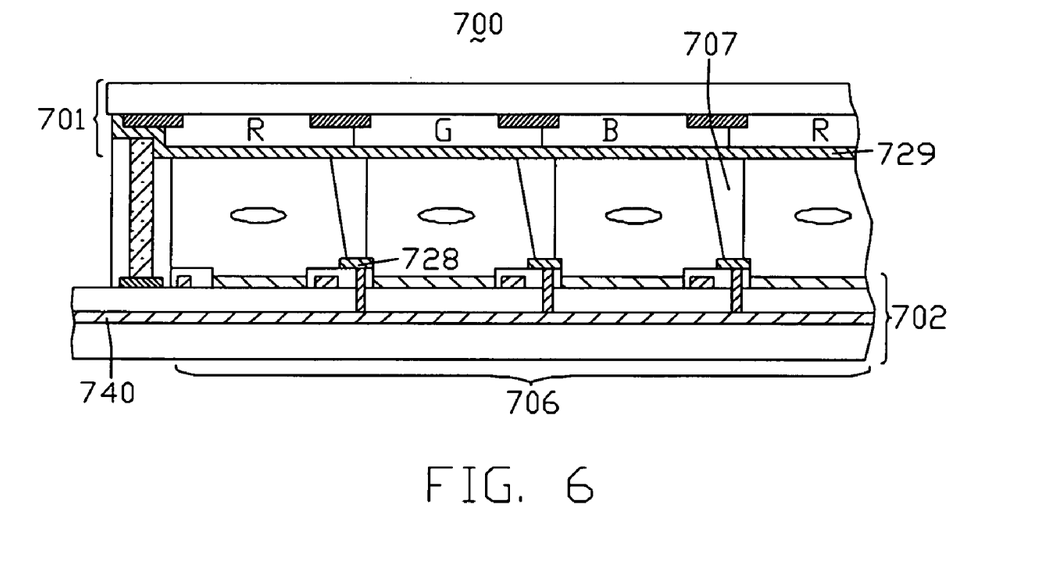
FIG. 6 is a side cross-sectional view of part of a liquid crystal panel according to a second embodiment of the present invention.

FIG. 6 is a side cross-sectional view of part of a liquid crystal panel 700 according to a second embodiment of the present invention. The liquid crystal panel 700 is similar to the above-described liquid crystal panel 400. However, the liquid crystal panel 700 includes a first substrate 701, and a second substrate 702 parallel to the first substrate 701. The first substrate 701 includes a common electrode layer 729 having a plurality of common electrodes (not labeled). The second substrate 702 includes a plurality of extending electrodes 728 and a plurality of common lines 740. A plurality of electrical conductive spacers 707 are respectively disposed at the extending electrodes 728. Each of the electrical conductive spacers 707 has an end electrically contacting with the common electrode layer 729. Moreover, the electrical conductive spacers 707 can be either independent pillars made of electrical conductive material, or protrusions extending from common electrode layer 729.

In the liquid crystal panel 700, the electrical conductive spacers 707 also provide elements for electrically coupling the common electrode layer 729 with the common lines 740 in an active area 706. Therefore, the display quality of the liquid crystal panel 700 can also be improved.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of arrangement of parts) within the principles of the invention to the full extent indicated by the broad general meaning of the terms in which the appended claims are expressed.

What is claimed is:

1. A liquid crystal panel, comprising:
a first substrate comprising a common electrode layer;
a second substrate parallel to the first substrate, the second substrate comprising a plurality of common lines, a plurality of scanning lines parallel to the common lines, a plurality of data lines perpendicular to the scanning lines, a first insulating layer between the common lines and the data lines, and a second insulating layer covering the data lines, each common line comprising a plurality of common electrodes extending from a main body of the common line; and
a liquid crystal layer disposed between the first and second substrates, the liquid crystal layer defining an active area thereat;
wherein a plurality of electrical coupling elements are disposed at the active area, at least one of the electrical coupling elements is provided for each common line, and the electrical coupling elements provide electrical coupling between the common electrode layer and the common lines without superposing the common electrodes of the common line;
wherein the active area comprises a plurality of pixel units arranged as an active matrix, each common line corresponds to a row of pixel units of the active matrix, and a respective one of the electrical coupling elements is provided for each pixel unit, each electrical coupling element comprises an extending electrode disposed on the second insulating layer and a through hole formed through the first and second insulating layers, the extending electrode is electrically coupled to the corresponding common line via the through hole, and is electrically coupled to the common electrode layer via a conductive spacer, the conductive spacer is located at a crossing of a corresponding nearest one of the data lines and the corresponding common line.

2. The liquid crystal panel as claimed in claim 1, wherein the second substrate further comprises a plurality of pixel electrodes disposed on the first insulating layer.

3. The liquid crystal panel as claimed in claim 2, wherein the second insulating layer is configured to insulate the pixel electrodes from the data lines.

4. The liquid crystal panel as claimed in claim 3, wherein the through hole comprises electrical conductive material disposed therein.

5. The liquid crystal panel as claimed in claim 1, wherein each common electrode is opposite to the corresponding pixel electrode, so as to form a storage capacitor for the corresponding pixel unit.

* * * * *

UNITED STATES PATENT AND TRADEMARK OFFICE
CERTIFICATE OF CORRECTION

PATENT NO. : 7,868,954 B2  
APPLICATION NO. : 12/080407  
DATED : January 11, 2011  
INVENTOR(S) : Hung-Yu Chen, Tsau-Hua Hsieh and Chih-Hao Chen Page 1 of 1

It is certified that error appears in the above-identified patent and that said Letters Patent is hereby corrected as shown below:

Title page item (73) should read as follows:

(73) Assignees: Chimei Innolux Corporation, Miao-Li County (TW).

Signed and Sealed this  
Seventh Day of June, 2011

David J. Kappos  
*Director of the United States Patent and Trademark Office*